US012629836B2

(12) United States Patent     (10) Patent No.: US 12,629,836 B2

Sun et al.     (45) Date of Patent:    May 19, 2026

(54) ROBOT SUSPENSION JUDGMENT METHOD BASED ON LASER POINTS, A MAP UPDATE METHOD AND A CHIP

(71) Applicant: AMICRO SEMICONDUCTOR CO., LTD., Zhuhai (CN)

(72) Inventors: Ming Sun, Zhuhai (CN); Hewen Zhou, Zhuhai (CN); Huibao Huang, Zhuhai (CN); Zhuobiao Chen, Zhuhai (CN); Songzhou Xu, Zhuhai (CN); Kun Xiong, Zhuhai (CN)

(73) Assignee: AMICRO SEMICONDUCTOR CO., LTD., Zhuhai (CN)

( * ) Notice: Subject to any disclaimer, the term of this patent is extended or adjusted under 35 U.S.C. 154(b) by 282 days.

(21) Appl. No.: 18/707,600

(22) PCT Filed: Nov. 3, 2022

(86) PCT No.: PCT/CN2022/129411

§ 371 (c)(1),
(2) Date: Oct. 13, 2024

(87) PCT Pub. No.: WO2023/078318

PCT Pub. Date: May 11, 2023

(65) Prior Publication Data

US 2025/0339967 A1     Nov. 6, 2025

(30) Foreign Application Priority Data

Nov. 4, 2021    (CN) .......................... 202111299994.8

(51) Int. Cl.
   *B25J 9/16*        (2006.01)
   *B25J 5/00*        (2006.01)
       (Continued)

(52) U.S. Cl.
   CPC ............. *B25J 9/1676* (2013.01); *B25J 5/007* (2013.01); *B25J 9/0009* (2013.01); *B25J 19/022* (2013.01)

(58) Field of Classification Search
None
See application file for complete search history.

(56) References Cited

FOREIGN PATENT DOCUMENTS

| | | | |
|---|---|---|---|
| CN | 105652876 A   *   6/2016 | ........... | G05D 1/0274 |
| CN | 106054208 A    10/2016 | | |

(Continued)

OTHER PUBLICATIONS

English WIPO translation of CN-109186463-A. (Year: 2019).*

(Continued)

*Primary Examiner* — Thomas E Worden
*Assistant Examiner* — Christopher A Buksa
(74) *Attorney, Agent, or Firm* — The Sun IP Law

(57) ABSTRACT

The present applicant discloses a robot suspension judgment method based on laser points, a map update method, and a chip. The method comprises: laser beams emitted by the laser sensor are controlled to scan an area to be detected, so as to obtain a laser beam simulation line segment; at the same time, a pre-built grid map is obtained; according to the number of obstacle grids passed by the laser beam simulation line segment within the allowable range of the ranging error, a laser beam simulation line segment with judgment function is obtained, and the laser beam simulation line segment with judgment function is counted; and according to a ratio of the number of laser beam simulation line segments with judgment function to the number of all laser beam simulation line segments, it is judged whether the mobile robot is in a suspended state.

15 Claims, 3 Drawing Sheets

(51) Int. Cl.
     *B25J 9/00*        (2006.01)
     *B25J 19/02*     (2006.01)

(56)             References Cited

FOREIGN PATENT DOCUMENTS

| CN | 106353769 | A | | 1/2017 | |
|----|-----------|---|---|--------|--|
| CN | 109031346 | A | | 12/2018 | |
| CN | 109186463 | A | * | 1/2019 | ............ G01B 11/02 |
| CN | 109917420 | A | | 6/2019 | |
| CN | 110852312 | A | | 2/2020 | |
| CN | 110858076 | A | | 3/2020 | |
| CN | 110895408 | A | | 3/2020 | |
| CN | 111198378 | A | | 5/2020 | |
| CN | 111982114 | A | | 11/2020 | |
| CN | 112365592 | A | | 2/2021 | |
| CN | 112835064 | A | | 5/2021 | |
| RU | 2562368 | C1 | | 9/2015 | |
| WO | 2012010839 | A1 | | 1/2012 | |

OTHER PUBLICATIONS

English WIPO translation of CN-105652876-A. (Year: 2016).*
The first Search Report of counterpart CN application No. 2202111299994.8 issued on Jul. 31, 2025.
Liu Ziming et al.;"Map construction of variable-height lidar odometry in indoor uneven ground environment"; Journal of Ningbo University ( NSEE );vol. 33 No. 4, Jul. 2020.

* cited by examiner

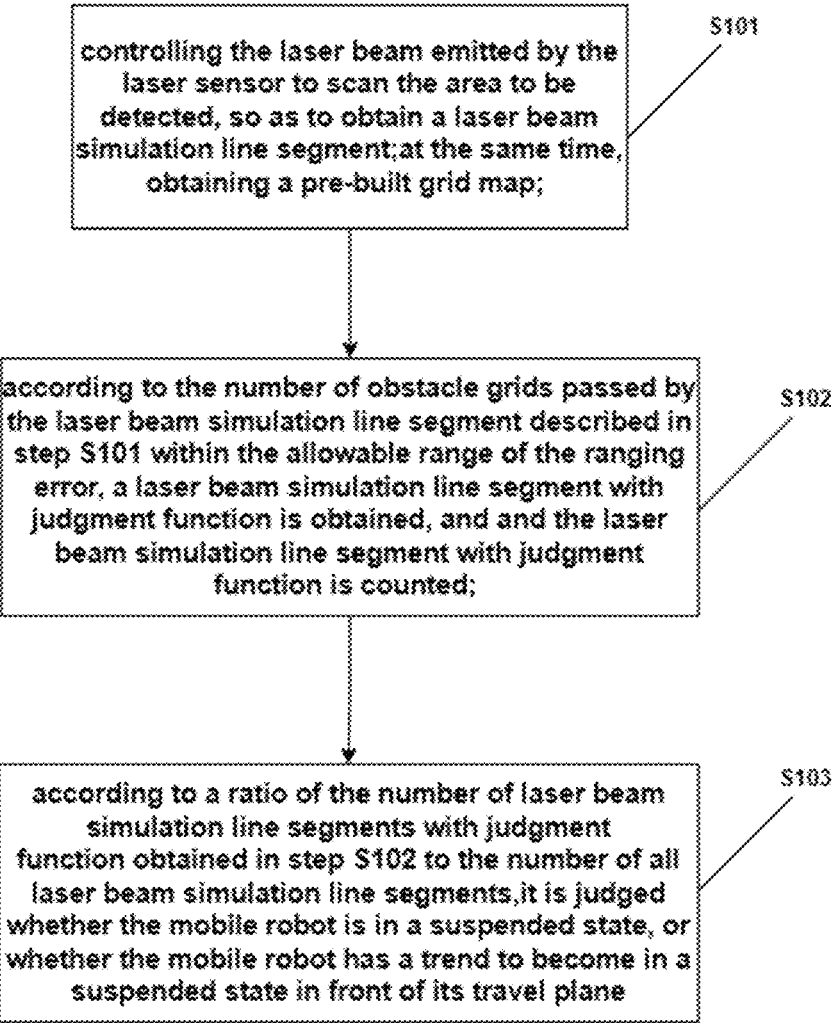

controlling the laser beam emitted by the laser sensor to scan the area to be detected, so as to obtain a laser beam simulation line segment;at the same time, obtaining a pre-built grid map;

S101 according to the number of obstacle grids passed by the laser beam simulation line segment described in step S101 within the allowable range of the ranging error, a laser beam simulation line segment with judgment function is obtained, and and the laser beam simulation line segment with judgment function is counted;

S102 according to a ratio of the number of laser beam simulation line segments with judgment function obtained in step S102 to the number of all laser beam simulation line segments,it is judged whether the mobile robot is in a suspended state, or whether the mobile robot has a trend to become in a suspended state in front of its travel plane

ROBOT SUSPENSION JUDGMENT METHOD BASED ON LASER POINTS, A MAP UPDATE METHOD AND A CHIP

TECHNICAL FIELD

The disclosure relates to the technical field of grid map optimization processing, in particular to a robot suspension judgment method based on laser points, a map update method and a chip.

BACKGROUND

In a home environment, there may be uneven surfaces such as steps and slopes on a travel plane of the mobile robot, so the mobile robot may be lifted or dropped during operation. At this time, for the mobile robot positioned by laser, its driving wheels will be suspended from the ground, so that the mobile robot is out of the original operating plane, and the mobile robot continues to construct maps.

At present, although a drop sensor is used to detect the lifting phenomenon of the driving wheel, and a cliff sensor is used to detect the falling phenomenon of the driving wheel, when the lifting phenomenon is detected, the mobile robot is already suspended in the air, and several frames of wrong laser point clouds will be collected and superimposed on the pre-built map, causing the map to overlap or the map to blur. Specifically, in response to the mobile robot crossing obstacles (crossing low toy obstacles, slopes, thresholds), due to its own height increase, it is possible to scan the laser point cloud information outside the wall, so that after being superimposed on the pre-built map, there may be a phenomenon that a wall obstacle that was supposed to block the moving of the robot is turned into the point cloud information on the back of the wall; in addition, in response to the mobile robot falling from the steps, due to the reduced detection height, it may sweep to laser point cloud information of the level ground, after being superimposed on the pre-built map in this way, the actual positioning information obtained is all point cloud information of the horizontal ground. Therefore, what is actually marked on the map is the location information outside the target detection area, causing map overlap or map blurring, thus affecting the normal navigation and positioning of the mobile robot using the map.

SUMMARY

In the scene where the robot may be lifted or dropped in its travel plane, the present disclosure discloses that the robot judges the possible lifting and dropping of the robot and adjusting the update strategy of the map in time to avoid the phenomenon that the constructed map does not match the real area to be detected by combining laser point cloud and grid map, the specific technical scheme is as follows: a robot suspension judgment method based on laser points, which is suitable for mobile robots equipped with laser sensors, the robot suspension judgment method comprises: a laser beams emitted by the laser sensor to scan an area to be detected are controlled, to obtain a laser beam simulation line segments; at the same time, a pre-built grid map is obtained; according to the number of obstacle grids passed by the laser beam simulation line segment within a allowable range of the ranging error, a laser beam simulation line segment with judgment function is obtained, and the laser beam simulation line segments with judgment function is counted; according to a ratio of the number of the laser beam simulation line segments with the judgment function to the number of all the laser beam simulation line segments, it is judged whether the mobile robot is in a suspended state, or whether the mobile robot has a trend to become in a suspended state in front of a travel plane of the mobile robot.

Further, according to the ratio of the number of the laser beam simulation line segments with the judgment function to the number of all the laser beam simulation line segments, the method for judging whether the mobile robot is in a suspended state, or whether the mobile robot has the trend to become suspended in front of the travel plane of the mobile robot comprises: the laser beams to be mapped to the laser beam simulation line segment in the grid map are controlled, wherein, in response to acquiring one frame of laser point cloud, a position of the laser sensor in the area to be detected is unchanged; in the one frame of the laser point cloud, in response to the ratio of the number of the acquired laser beam simulation line segments with the judgment function to the number of all the laser beam simulation line segments which map in the grid map is less than or equal to a preset ratio threshold, it is determined that the mobile robot is not in the suspended state, or that there is no tendency to become the suspended state in front of the travel plane of the mobile robot; in the one frame of the laser point cloud, in response to the ratio of the number of the acquiring laser beam simulation line segments with the judgment function to the number of all the laser beam simulation line segments which map in the grid map is greater than the preset ratio threshold, it is determined that the mobile robot is in the suspended state, or that there is the tendency to become the suspended state in front of the travel plane of the mobile robot.

Further, the suspended state comprises that a front part of a body of the mobile robot is titled upwards to determine that the mobile robot is lifted relative to a current travel plane during a movement process, and the driving wheels of the mobile robot are changed to a suspended state; the suspended state also comprises that the front part of the mobile robot body is titled downwards to determine that the mobile robot drops relative to the current travel plane during the movement process, and the driving wheels of the mobile robot become in the suspended state.

Further, a source of each of the obstacle grids passed by the laser beam simulation line segment within the allowable range of the ranging error is: in the grid map, along a straight line direction of the laser point pointing to an observation point, a point that is apart from the laser point by a preset error distance is set as a target positioning point; wherein, the connection line between the observation point and the laser point is the laser beam simulation line segment; the observation point is marked as a position of the laser sensor in the grid map; then, in the case of excluding the grid where the observation point is located and the grid where the target positioning point is located, the obstacle grid passing through a line connecting the observation point and the target positioning point is marked as a pre-configured obstacle grid, and it is determined that the pre-configured obstacle grid is the obstacle grid passed by the laser beam simulation line segment within the allowable range of the ranging error; wherein, the obstacle grid is a grid occupied by an obstacle in an area to be detected.

Further, in response to the observation point being located on a edge of a grid, the grid where the observation point is located is a first grid that the laser beam simulation line segment passes along a laser observation direction; wherein, the laser observation direction is a straight line direction from the observation point points to the laser point to form the laser observation direction of the laser beam simulation line segment; in response to the target positioning point being located on the edge of the grid, the grid where the target positioning point is located is the first grid through which a line connecting the target positioning point and the laser point to pass along the laser observation direction.

Further, according to the number of the obstacle grids passed by the laser beam simulation line segments within the allowable range of the ranging error, the method for obtaining the laser beam simulation line segments with the judgment function comprises: in the laser beam simulation line segment, along the line connecting the observation point and the target positioning point, counting the pre-configured obstacle grids that this line passes through to achieve a count value; and in response to the count value of the pre-configured obstacle grids is greater than a preset number threshold, the laser beam simulation line segment where the connection line between the observation point and the target positioning point is located is set as the laser beam simulation line segment with the judgment function, so that a laser beam corresponding to a straight line direction of the observation point to the target location point is marked as the laser beam with the judgment function.

Further, the robot suspension judgment method also comprises: in response to the connection line between the observation point and the target positioning point does not pass through the obstacle grid, the laser beam simulation line segment where the target positioning point and the observation point are located is not set as the laser beam simulation line segment with the judgment function, then a currently acquired increment of the number of the laser beam simulation line segments with the judgment function is 0.

Further, the robot suspension judgment method also comprises: in response to a length of the line connecting the target positioning point and the laser point is greater than a length of the line connecting the observation point and a same laser point, the laser beam simulation line segment where the target positioning point and the observation point are located is not set as the laser beam simulation line segment with judgment the function, then a currently acquired increment of the number of the laser beam simulation line segments with the judgment function is 0.

Further, in response to a length of the line connecting the observation point and the laser point is less than a preset threshold length, the preset error distance is a fixed value; in response to the length of the line connecting the observation point and the laser point is greater than or equal to the preset threshold length, the preset error distance is positively correlated with a length of the laser beam simulation line segment.

Further, a manner in which the laser point is on the grid comprises that the laser point is located in an area surrounded by the four edges of the grid, and the laser point is located on a side of the grid, to reflect the two-dimensional location information of a scanned object; wherein, in one frame of laser point cloud, the observation point is fixed, one target positioning point corresponds to one laser point, one laser beam corresponds to one laser point, one laser beam simulation line segment corresponds to one laser point, and one laser beam corresponds to one laser point, one laser beam corresponds to one laser beam simulation line segment.

Further, the robot suspension judgment method also comprises: a laser information for controlling the reflection of the laser beam reflect in the area to be detected to convert into a laser point in the grid map, wherein the laser point is used to represent a positioning point where a scanned position point falls in the grid map; in response to ever the laser beam rotating once in the area to be detected, the converted laser points form one frame of laser point cloud; wherein, one laser beam corresponds to one laser point and one scanning angle corresponds to one laser point; in the grid map, in response to the line between an observation point and a laser point being set as the laser beam simulation line segment, then it is determined that the laser beam is mapped as the laser beam simulation line segment in the grid map, so that a laser beam simulation line segment corresponds to a laser point; wherein, the observation point is a position marked by the laser sensor on the grid map, and the observation point is used to indicate a starting emission point of the laser beam.

A map update method based on laser points, wherein, the map update method comprises the robot suspension judgment method; the map update method also comprises: in one frame of laser point cloud, in response to a ratio of the number of the acquired laser beam simulation line segments with the judgment function to the number of all the mapped laser beam simulation line segments is less than or equal to a preset ratio threshold, updating the information carried by the one frame of laser point cloud to an associated information of the grid corresponding to the hit in the grid map, to realize the update of a pre-built grid map in an area to be detected; in the one frame of laser point cloud, in response to the ratio of the number of the acquired laser beam simulation line segments with the judgment function to the number of the all mapped laser beam simulation line segments is great than the preset ratio threshold, stopping updating the grid map.

Further, the method for updating the information carried by the one frame of the laser point cloud to the associated information of the grid corresponding to the hit in the grid map comprises: updating the pose information carried by the one frame of laser point cloud to the position information of the grid corresponding to the hit in the grid map, to configure a latest hit grid of the corresponding laser point in the grid map; wherein, the laser points existing in the one frame of laser point cloud are the coordinate points converted from the scanned position points in the area to be detected to a coordinate system of the grid map, the pose information carried by the laser points comprises angle information and distance information; at the same time, a probability that the obstacle at the scanned position point falls into the corresponding grid position of the grid map is updated to the probability that the laser point hits the corresponding grid in the grid map.

Further, the grid corresponding to the hit in the grid map is a grid with the smallest positioning error with the scanned position point, comprising a neighboring grid of the grid where the laser point is located, or the grid where a point passed by the laser beam simulation line segments and located at a reasonable distance from the laser point is located.

A chip, wherein, the chip implements the robot suspension judgment method, and/or the map update method by executing the algorithm program code stored in the chip.

BRIEF DESCRIPTION OF THE DRAWINGS

FIG. 1 is a flow chart of a robot suspension judgment method disclosed according to an embodiment of the present disclosure.

DETAILED DESCRIPTION

Figure 2:
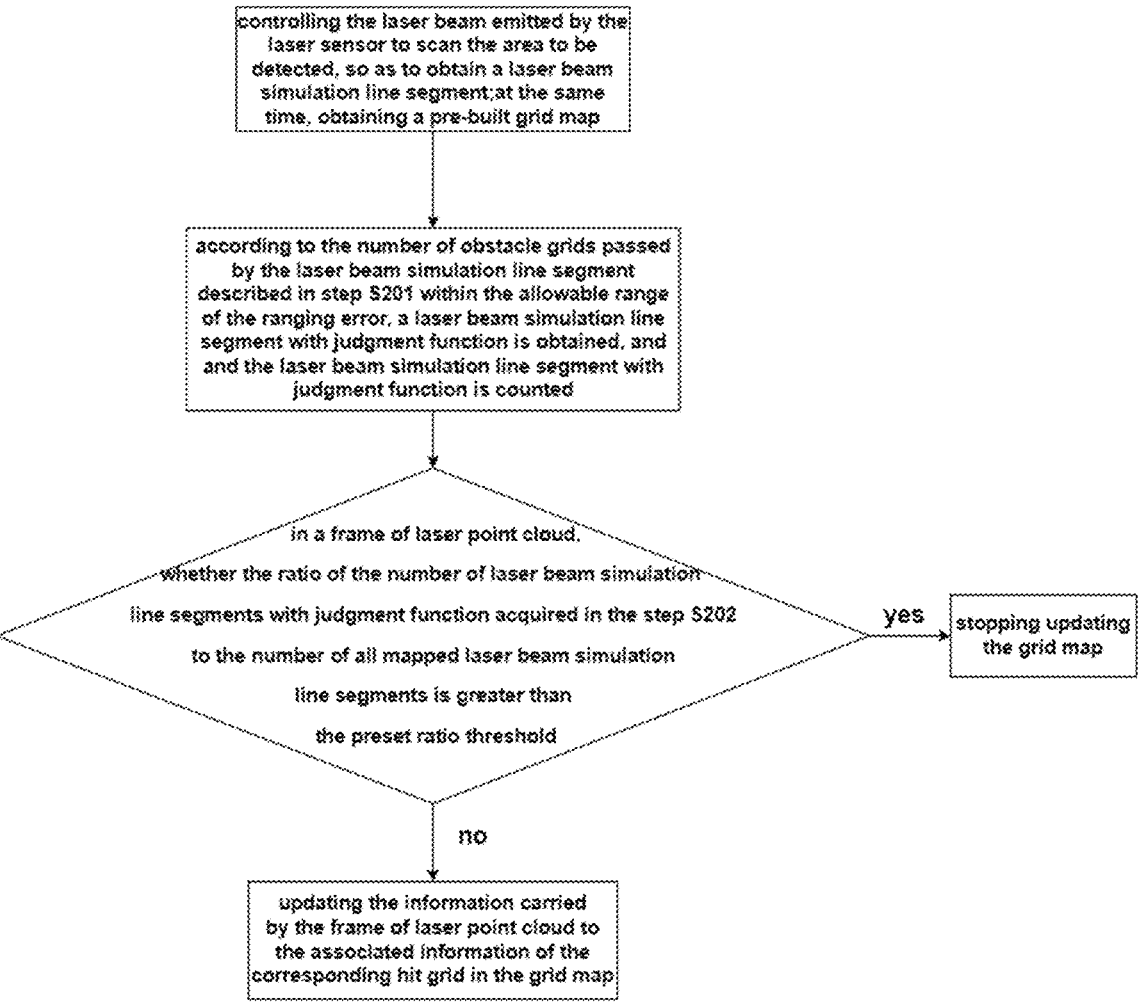
FIG. 2 is a flow chart of a map update method based on laser points disclosed according to another embodiment of the present disclosure.

The technical solutions in the embodiments of the present disclosure will be described in detail below with reference to the drawings in the embodiments of the present disclosure.

The embodiment of the present disclosure provides that robot suspension judgment method based on laser points can be applied to mobile robots, especially mobile robots working in an indoor environment, comprising sweeping robots, inspection robots, unmanned sampling robots, unmanned forklifts, and the like. Among them, the mobile robot includes the main body of the robot, sensors, controllers and walking mechanisms. The main body of the robot is the main structure of the robot. The corresponding shape structure and manufacturing materials (such as hard plastic or aluminum, iron and other metals) can be selected according to the actual needs of the robot.), such as a relatively flat cylindrical shape common to sweeping robots. The walking mechanism is arranged on the main body of the robot and is a structural device that provides mobility for the mobile robot. The running mechanism can be realized by using any type of moving device, such as rollers, crawlers, and the like. The sensor is used to perceive the external environment and obtain the depth information of the surrounding environment (such as the two-dimensional point cloud image of the surrounding environment of the robot). Specifically, the sensor may use any type of existing depth information collection equipment, including but not limited to laser sensors and RGBD cameras. At least one sensor can be set to meet the omnidirectional detection range of angles from 0 to 360 degrees.

Taking a cleaning robot as an example, a controller is installed inside the body of the cleaning robot, and a driving wheel is installed on the left and right sides of the cleaning robot; a laser sensor, such as a laser radar, is installed on the top of the body of the mobile robot as a navigation and positioning apparatus for the mobile robot. The controller is electrically connected to the drive wheel and the laser sensor respectively. The main body of the cleaning robot comprises a forward part and a rearward part, having an approximately circular shape (both front and rear are circular), and may also have other shapes, including but not limited to an approximately D-shaped shape with a rectangle at the front and a circle at the rear, or a rectangle at the front and a rectangle at the rear, or square shape.

In some embodiments, the collision sensor and the proximity sensor arranged on the forward part of the main body of the cleaning robot, the cliff sensor arranged at the lower part of the main body of the cleaning robot, the controller arranged inside the main body of the cleaning robot, magnetometer, acceleration sensor, gyroscope(Gyro), odometer (ODO, full name odograph) installed inside the drive wheel, drop sensors installed in the slot where the left drive wheel and right drive wheel are connected to the chassis of the body, are used to provide various position information and motion status information of the machine to the controller.

There may be uneven surfaces such as steps and slopes in front of the travel plane of the cleaning robot. In the prior art, the cleaning robot can detect the road ahead through the cliff sensor installed on the bottom of its front side, and give accurate feedback to avoid falling into the cliff, and then based on the relative depth between the travel plane and the bottom of the body given by the feedback signal, to detect whether the front part of the body of the cleaning robot is lifted; a drop sensor is installed in the wheel set installation slot between the bottom edge of the cleaning robot and each driving wheel, and the drop sensor is synchronized with the corresponding driving wheel. In response to the cleaning robot being tilted at an angle due to climbing or being lifted by the inclined tube, the driving wheel is not opposed by the external ground (the current travel plane), thus triggering the drop sensor to generate an induction signal, which is sent to the internal controller of the cleaning robot to make a judgment that the driving wheel of one side of cleaning robot on the corresponding side is in a suspended state.

The drive wheel has a spring part fastened to the body in a movably manner, for example attached to the chassis of the cleaning robot in a rotatable manner, and receives a downward abutting force, the spring part allows the drive wheel to land on the ground with a certain force maintains the contact with the ground and can be buffered by its elastic force. The drop sensor is taken as a limit switch, and the limit switch can be pressed under the contact of the spring component, so that the drop sensor has the physical contact conditions for triggering. At the same time, the cleaning elements of the cleaning robot also touch the ground with a certain pressure. The controller can steer the cleaning robot across different types of ground based on drive commands having distance and angular information (e.g., x, y, and z components). The controller comprises a driving wheel module, which can simultaneously control the left driving wheel and the right driving wheel. In order to control the movement of the cleaning robot more accurately, preferably, the driving wheel module comprises a left driving wheel module and a right driving wheel module, the left drive wheel module and the right drive wheel module are arranged symmetrically along the transverse axis defined by the body. In order to enable the cleaning robot to move more stably on the ground or configured with a stronger movement capability, the cleaning robot may include at least one driven wheel, and the driven wheels include but are not limited to universal wheels for changing steering. The driving wheel module includes a driving wheel, a driving motor, and a control circuit for controlling the driving motor. The driving wheel module can also be connected with a circuit for measuring the driving current, an odometer, and a drop sensor, so that the drop sensor is triggered in response to the body being lifted or dropped. Although the aforementioned related sensors can be used to detect that the robot is tilted up or down, in response to the robot detecting the corresponding behavior, the real-time collected point cloud information has been constructed on the grid map, the collection is not within the original detection range, but using the object features of the rest of the height instead.

In some cases, in response to the cleaning robot crossing obstacles (crossing low toy obstacles, slopes, and thresholds), due to the increase in height, it is possible to scan the image at a position higher than the preset travel plane, making the cleaning robot detect images outside the current working area in response to overcoming obstacles. For example, in response to the walls of the room where the cleaning robot works are relatively short and the cleaning robot is overcoming obstacles, the cleaning robot may scan images outside the wall due to its height increase. The detected obstacle position will mark the image outside the current working area in the grid map constructed in real time, and the corresponding wrong point cloud information will be superimposed on the map, which may easily cause misjudgment of the position of the robot, and it is impossible to distinguish the real work area. In this way, in response to cleaning robots, such as sweeping robots completing the cleaning by traversing the entire apartment area in the family room, they will repeatedly enter and exit the same room, or appear alternately between different rooms. In response to cleaning in the family room, cleaning will be completed through the whole home area, which will be in and out of the same room repeatedly, or alternately between different rooms. So that completing the cleaning task of a room directly leads to low cleaning efficiency, indirectly leads to repeated cleaning, missed cleaning, etc, and reduces user experience.

It should be noted that the environment map formed by the laser point cloud needs to be divided according to one preset grid size to obtain a grid map, and the grid map includes multiple grids. For example, the environment map is divided according to the square size of 0.2*0.2 m to obtain a grid map with a grid size of 0.2*0.2 m. The controller is an electronic computing core built into the main body of the robot, and is used to execute logical operation steps to realize intelligent control of the robot. The controller is connected with the laser sensor, and is configured to execute a preset algorithm to compose a map to obtain a map image according to the depth information of the surrounding environment collected by the laser sensor. In the map image, for the convenience of distinction, obstacles usually have pixel values different from other areas. For example, in some embodiments, the pixel values of obstacles and the pixel values of the ground are set in the same range of pixel values, so that it reflects the laser point cloud information of the mobile robot that is swept out of the wall due to the increase in the height of the body in response to the mobile robot being tilted and lifted, and the laser point cloud information that the mobile robot may be scanned to the horizontal ground due to the decrease in the detection height in response to the mobile robot drops from the steps.

In order to overcome the problem of map overlap blur caused by the lag of related detection methods in the prior art or some undetectable scenes, the embodiment of the present disclosure discloses a robot suspension judgment method based on laser points. For the mobile robot, in this embodiment, a laser sensor is fixedly installed on the body of the mobile robot for omnidirectional detection from 0 to 360 degrees to obtain environmental information around the mobile robot. As shown in FIG. 1, the robot suspension judgment method based on laser points comprises: step S101, the laser beams emitted by the laser sensor to scan the area to be detected are controlled, to obtain a laser beam simulation line segment; at the same time, a pre-built grid map is obtained; and then proceeding to step S102. It should be noted that the laser probe of the laser sensor rotates at a constant speed to detect its surrounding environment; the laser sensor uses the laser beam to scan the spatial range of the area to be detected by angle, and each angle corresponds to a laser point, the laser points at the angles used are added together to form one frame point cloud; at least one laser beam emitted by the laser sensor repeatedly scan the same area to be detected, and then all the laser beams are rotated one circle to obtain the point cloud or one frame of laser point cloud is composed of a point cloud collected by a laser beam rotating once. However, the grid map acquired at the same time is pre-built, and the laser point cloud collected in real time is not converted into the grid map, so that the pre-built grid map does not reflect the environmental information collected by the mobile robot in real time.

Step S102, according to the number of obstacle grids passed by the laser beam simulation line segment described in step S101 within the allowable range of the ranging error, a laser beam simulation line segment with judgment function is obtained, and the laser beam simulation line segment with judgment function is counted; then turn into step S103. In step S102, there is a statistics of the number of obstacle grids that are actually traversed in the grid map by the laser beam simulation line segment described in step S101, which is understood as the frequency of visits to the corresponding type of obstacle grid passed by each laser beam simulation line segment, rather than the frequency of visits to the same obstacle grid, to obtain the obstacle grid passed by the laser beam simulation line segment within the allowable range of the ranging error, so that the number of grids is larger, the passability of the route corresponding to the laser beam simulation line segment is obtained indirectly; in response to the number of obstacle grids obtained by counting is less, the passability of the route corresponding to the laser beam simulation line segment is better; in response to the number of obstacle grids obtaining by counting is more, the passability of the route corresponding to the laser beam simulation line segment is poorer; thereby reflecting that the smoothness of the mobile robot moving in the direction indicated by the laser beam simulation line segment and the accessibility of the surrounding environment of the mobile robot; on this basis, the number of the laser beam simulation line segments with judgment function is counted for the subsequent judgment of the suspended state.

Step S103, according to a ratio of the number of laser beam simulation line segments with judgment function obtained in step S102 to the number of all laser beam simulation line segments, it is judged whether the mobile robot is in a suspended state, or whether the mobile robot has a trend to become in a suspended state in front of its travel plane, to adjust the update strategy of the aforementioned grid map in time, that is, in response to it is judged that the mobile robot is in the suspended state, the previously constructed grid map is not updated, to avoid marking wrong positioning information in the map; or in response to it is judged that there is a tendency to become suspended in front of the travel plane of the mobile robot, that is, in response to judging that there is a cliff face, a step face or a slope in front of the travel plane of the mobile robot, the previously constructed grid map is not updated, to avoid marking wrong positioning information in the map. In response to it is judged that the mobile robot is not in the suspended state and the mobile robot configured with no tendency to become suspended in front of the travel plane, the previously constructed grid map is updated to mark the location information of the real working area of the robot on the map. Wherein, the ratio of the number of laser beam simulation line segments with judging function to the number of all laser beam simulation line segments judges whether the mobile robot is in a suspended state or judges whether the front of its travel plane will become a suspended state, including whether the mobile robot is in the state of being tilted and lifted or in the state of dropping, the traversal frequency (the aforementioned ratio) of the obstacle grid in all detectable directions can be used to judge the state of the mobile robot or predict its forward direction movement trends. In summary, the real-time positioning information of the map can be adjusted more effectively, creating conditions for the robot to plan a new navigation path after overcoming the suspended state, and reach the area that really needs to work.

As an optional embodiment, wherein, according to a ratio of the number of laser beam simulation line segments with judgment function to the number of all laser beam simulation line segments, the method for judging whether the mobile robot is in a suspended state, or whether the mobile robot has a trend to become suspended in front of its travel plane comprises: controlling the laser beam to be mapped to the laser beam simulation line segment in the grid map, wherein, in response to acquiring one frame of laser point cloud, a position of the laser sensor in the area to be detected is unchanged; in this embodiment, all the laser beams required for one frame of laser point cloud collected are converted into the laser beam simulation line segment, that is, map the current frame of laser point cloud to the laser beam simulation line segment, and then judge the laser beam simulation line segment with judgment function from the mapped laser beam simulation line segment and count the laser beam simulation line segment with judgment function. The mapping relationship involved is that each laser point in one frame of laser point cloud currently collected can correspond to a laser beam, so that each laser point can correspond to a laser beam simulation line segment, and each laser point can be converted into the preset in the constructed grid coordinate system.

In one frame of laser point cloud, that is, the ratio of the laser point constraint range corresponding to one frame of laser point cloud, in response to the number of the laser beam simulation line segments with judgment function obtaining through the aforementioned step S102 to the number of all mapped laser beam simulation line segments is less than or equal to a preset ratio threshold, it is determined that the mobile robot is not in a suspended state or that there is no tendency to turn into a suspended state in front of the travel plane of the mobile robot; the laser beam simulation line segment corresponding to the laser point in the detectable direction of multiple laser beams is taken to judge the ratio; the preset ratio threshold is the experimental results obtained by the mobile robot by constructing a grid map from the laser point cloud in the lifting scenario or dropping scenario, and it is the frequency threshold information obtained by repeated experiments in the area to be detected, to distinguish the grid constructed by the laser point cloud collected on a flat travel plane map information.

In the one frame of laser point cloud, that is, within the laser point constraint range corresponding to one frame of laser point cloud, in response to a ratio of the number of the acquiring laser beam simulation line segments with judgment function obtained through the aforementioned step S102 to the number of all mapped laser beam simulation line segments is greater than the preset ratio threshold, it is determined that the mobile robot is in a suspended state, or that there is a tendency to turn into a suspended state in front of the travel plane of the mobile robot, that is, it is determined that the travel plane is a slope surface, a step surface or a cliff surface in the front of the travel plane of the mobile robot. It is worth noting that in response to it is judged that there is a tendency to become suspended in front of the travel plane of the mobile robot, it is determined that the robot has not moved to the area where the suspension occurs, and it is necessary to stop updating the real-time collected laser point cloud to the grid in time. On the map, avoid guiding the mobile robot to move to the wrong area based on the updated grid map, and away from the real working area (deemed as the preset target working area). Among them, it involves that the laser beam simulation line segments corresponding to the laser points in the detectable directions of the multiple laser beams all participate in the judgment of the ratio; specifically, the suspended state includes that the front part of the body of the mobile robot is tilted and lifted, to determine the conflict that the mobile robot is lifted by a slope relative to the current travel plane or is tilted and lifted during obstacle surmounting, and the driving wheels of the mobile robot are separated from the external ground (current travel plane) to become in the suspended state; the suspended state also includes the front part of the body of the mobile robot tilting downward, to determine that the mobile robot drops relative to the current travel plane during the movement, and to allow the driving wheels of the mobile robot to break away from the external ground (the current travel plane) turns into the suspended state, thus dropping below the current travel plane.

To sum up, in one frame of laser point cloud, each time there is a laser beam simulation line segment with judgment function, the access frequency of the number of the laser beam simulation line segment with judgment function increases by 1, and after traversing all the frame of laser point cloud, that is, in response to traversing all the laser beam simulation line segments in the detectable direction, the laser beam simulation line segment with judgment function corresponds to an access frequency, thereby forming a frequency information corresponding to a type of laser beam, in order to realize the judgment of the actual suspended state of the robot or the suspended state faced in front of the travel plane at the level of the grid map, to predict the passability of the robot, to adjust the real-time positioning of the map more effectively information, creating conditions for the robot to plan a new navigation path after overcoming the suspended state, to reach the areas that configured with real needs to work.

Figure 3:
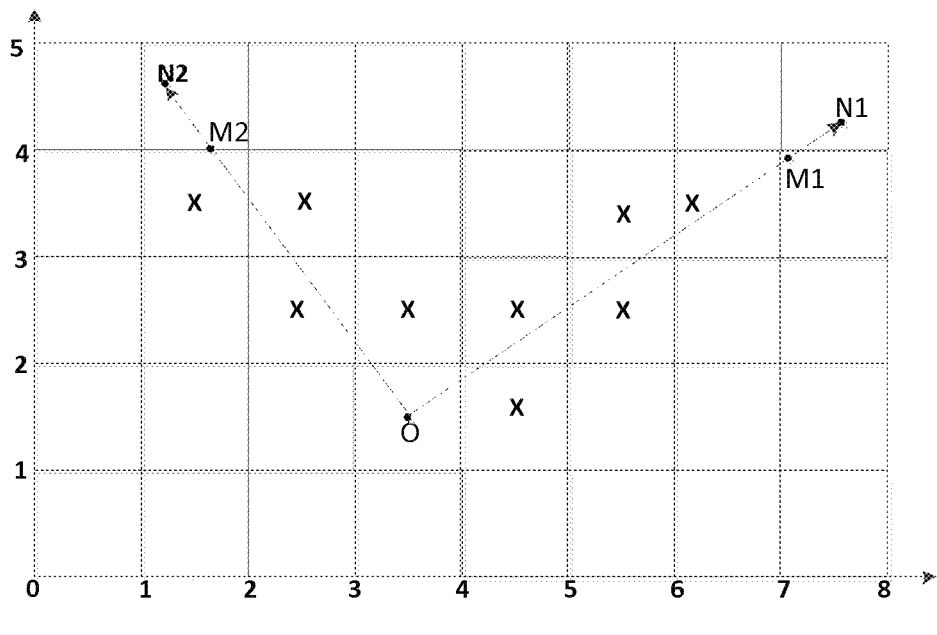
FIG. 3 is a schematic diagram of a laser beam simulation line segment passing through an obstacle grid in a grid map according to an embodiment of the present disclosure.

As an example, with reference to FIG. 3, it can be seen that the source of the obstacle grids passed by the laser beam simulation line segment within the allowable range of the ranging error is: in the grid map, along a straight line direction of the laser point pointing to an observation point, a point that is apart from the laser point by a preset error distance is set as the target positioning point; wherein, the connection line between the observation point and the laser point is the laser beam simulation line segment; the observation point is marked as the position of the laser sensor in the grid map. The grids in the grid map shown in FIG. 3 are neatly arranged, and the grids in the grid map are neatly arranged in rows and columns, and the point O is taken as the grid position occupied by the laser sensor of the robot, that is, the observation point; the N1 point in FIG. 3 is a laser point, wherein, in response to the laser point being in the area surrounded by four edges of a grid, it means that the grid is the grid where the laser point is located; and the connection line between point O and point N1 is the laser beam simulation line segment, forming the laser beam simulation line segment ON1; in the present embodiment, on the laser beam simulation line segment, the point M1 is set as the target positioning point, wherein the length of the line segment M1N1 is equal to the preset error distance; preferably, in response to the length ON1 of the line connecting the observation point O and the laser point N1 is less than a preset threshold length, the preset error distance is a fixed value; in response to the length ON1 of the connecting line between the observation point O and the laser point N1 being greater than or equal to the preset threshold length, the preset error distance is positively correlated with the length of the laser beam simulation line segment; wherein, the exact value of the preset threshold length varies with the specification parameters of the laser sensor actually used.

Then, in the case of excluding the grid where the observation point is located and the grid where the target positioning point is located, the obstacle grid passing through the line connecting the observation point and the target positioning point is marked as a pre-configured obstacle grid, and it is determined that the pre-configured obstacle grid is the obstacle grid passed by the laser beam simulation line segment within the allowable range of ranging error; wherein, the obstacle grid is the grid occupied by the obstacle in the area to be detected. In the grid map shown in FIG. 3, on the line segment OM1, except for the grid where the observation point O is located and the grid where the target positioning point M1 is located, all the grids that the line segment OM1 passes through in the grid map are shown in FIG. 3 is marked with X, wherein, for the grid marked as X, this embodiment performs binarization processing on it, and in response to X being detected to 0, it means that the grid is a blank grid or an unknown grid; in response to X being detected to 1, it means that this grid is an obstacle grid, that is, the pre-configured obstacle grid. At this time, the obstacle grid passed by the line connecting the observation point O and the target positioning point M1 is marked as the pre-configured obstacle grid.

As an embodiment, in response to the target positioning point being located on the edge of the grid, the grid where the target positioning point is located is the first grid through which the line connecting the target positioning point and the laser point to pass along the laser observation direction; wherein, the laser observation direction is that above-mentioned observation point points to the straight line direction of described laser point, to form the laser observation direction of described laser beam simulation line segment. In the grid map shown in FIG. 3, point N2 is another laser point, where the laser point N2 is in the area surrounded by four edges of a grid, which means that the grid is the grid where the laser point N2 is located; the connection line between point O and point N2 is the laser beam simulation line segment, forming the laser beam simulation line segment; in present embodiment, on the laser beam simulation line segment ON2, point M2 is set as the target positioning point, wherein, the length of the line segment M2N2 is equal to the preset error distance; the laser observation direction of the laser beam simulation line segment ON2 is the straight line direction from the observation point O pointing to the laser point N2, that is, the direction indicated by the arrow of the laser beam simulation line segment ON2; as shown in FIG. 3, the target positioning point M2 is located on the edge of the grid, the grid where the target positioning point M2 is located is the first grid that the line segment M2N2 passes along the laser observation direction (the arrow of the laser beam simulation line segment ON2), correspondingly, in the map coordinates system shown in FIG. 3, the coordinates of the grids lower left corner point are used to represent the coordinates of the grid, then the coordinates of the grid where the laser point N2 is located are (1, 4), and the coordinates of the grid where the target positioning point M2 is located are also (1,4). Therefore, along the laser observation direction or the laser beam simulation line segment, the grid where the laser point is located is searched from the surrounding area of the laser point, close to the actual physical position, and the effectiveness of laser point positioning is improved.

As an embodiment, in response to the observation point being located on a edge of the grid, the grid where the observation point is located is a first grid that the laser beam simulation line segment passes along its laser observation direction; wherein, the laser observation direction is the straight line direction from the observation point to the laser point to form the laser observation direction of the laser beam simulation line segment; in combination with the foregoing embodiment, it can be seen that in response to the connection line between point O and point N2 forming the laser beam simulation line segment, the laser observation direction of the laser beam simulation line segment ON2 is the straight line direction from the observation point O pointing to the laser point N2, that is, the direction indicated by the arrow of the laser beam simulation line segment ON2, and the grid where the observation point O is located is a first grid that the laser beam simulation line segment ON2 passes along a laser observation direction; if the observation point shown in FIG. 3 is translated to an edge directly below the grid with coordinates (3,1) and the position of the laser point N2 remains unchanged, the grid where the observation point O is located can be a grid with coordinates (3, 1) or a grid with coordinates (2, 1). The specific technical effect of the manner of determining the grid where the observation point is located is similar to that of the above-mentioned embodiment.

Specifically, in response to the column number of the obtained grid being s0, and the row number of the obtained grid being h0, then in the grid map shown in FIG. 3, the neighboring grids of the grid are grids where the numerical range of the row number is [h0−1, h0+1] and the value range of the column number is [s0−1, s0+1], wherein, s0 is an integer and h0 is an integer. In the grid map shown in FIG. 3, the column number of the grid where the target positioning point M1 is located in FIG. 3 is 7, and the row number of the grid where target positioning point M1 is located in FIG. 3 is 3; in the grid map shown in FIG. 3, the column number of the grid where the laser point N1 is located in FIG. 3 is 7, and the row number of the grid where the target positioning point N1 is located in FIG. 3 is 4; the column number of the grid where the observation point O in FIG. 3 is located is 3, and the row number of the grid where the observation point O in FIG. 3 is located is 1; the column number of the grid where the target positioning point M2 is located in FIG. 3 is 1, and the row number of the grid where the target positioning point M2 is located in FIG. 3 is 4; in the grid map shown in FIG. 3, the column number of the grid where the laser point N2 in FIG. 3 is located is 1, and the row number of the grid where the laser point N2 in FIG. 3 is located is 4. In the map coordinate system of the grid map disclosed in this embodiment, the coordinates of each grid are the coordinates of the lower left corner point of the grid, wherein the coordinates of the lower left corner point of the grid are used to represent the row numbers and column numbers of the grid in the grid map, the abscissa is equal to the column number, and the ordinate is equal to the row number. As shown in the grid map in FIG. 3, in response to traversing the grid from left to right, the column numbers gradually increase; in response to traversing the grid from bottom to top, the row numbers gradually increase. In this way, it is ensured that the paths generated by grid connections one by one in the grid map are continuous. For ease of understanding, in the map coordinate system shown in FIG. 3, the coordinates of the lower left point of grid are used to represent the coordinates of the grid.

As an optional embodiment, according to the number of obstacle grids passed by the laser beam simulation line segment within the allowable range of ranging error, the method for obtaining the laser beam simulation line segment with judgment function comprises: in the laser beam simulation line segment, along the line connecting the observation point and the target positioning point, counting the pre-configured obstacle grids that the line passes through; correspondingly, for the line segment OM1 shown in FIG. 3, except for two outside the grid where the end point is located, counting the obstacle grids passed by the rest, which can be counted one by one obstacle grid along the direction from the observation point O to the target positioning point M1, to obtain the number of preconfigured obstacle grids on the laser beam simulation line segment ON1, or obtain the count value of the preconfigured obstacle grids on the line segment OM1, wherein the line connecting the observation point O and the target positioning point M1 is located at the laser beam simulation line segment ON1. At the same time, in the line segment OM2 shown in FIG. 3, except for the grids where the two end points are located, counting the obstacle grids passed by the rest, which can be counted one by one obstacle grid along the direction from the observation point O to the target positioning point M2, to obtain the number of preconfigured obstacle grids on the laser beam simulation line segment OM2, or obtain the count value of the preconfigured obstacle grids on the line segment OM2, wherein the line connecting the observation point O and the target positioning point M2 is located at the laser beam simulation line segment OM2.

For a laser beam simulation line segment, specifically for a laser beam simulation line segment in one direction, in response to it is judged that the count value of the pre-configured obstacle grid is greater than the preset number threshold, the laser beam simulation line segment where the connection line between the observation point and the target positioning point is located is set as the laser beam simulation line segment with judgment function, then the laser beam simulation line segment with judgment function is obtained in the frame of laser point cloud, and then the laser beam corresponding to a straight line direction from the observation point to the target positioning point is marked as the laser beam simulation line segment with judging function, that is, in one frame of laser point cloud, in response to ever it is judged along one of the laser beam simulation line segments that the count value of the pre-configured obstacle grid is greater than the preset number threshold, the laser beam simulation line segment where the connection line between the observation point and the target positioning point is located is set as the laser beam simulation line segment with judgment function, thereby obtaining a laser beam simulation line segment with judgment function as a newly determined one laser beam simulation line segment with judgment function in the laser point cloud or a laser beam with a judgment function, to extract the laser beam simulation line segment with judgment function, which can represent that the number of obstacles detected by the mobile robot in the process of moving along the line connecting the observation point and the target positioning point, and then realize the simulation of the collision of the mobile robot with the obstacles in the process of moving along the laser beam simulation line segment, and the number and distribution of obstacles in the corresponding laser observation direction feature. Therefore, the laser beam simulation line segment can become a simulated route for the mobile robot to traverse the obstacle grid.

It should be noted that the preset number threshold is the experimental result obtained through using the laser point cloud collected in real time to construct a grid map in response to the mobile robot is lifted or dropped, and it belongs to repeated detection in the area to be detected. The threshold of the number of obstacles in a specific direction is obtained experimentally to distinguish the raster map information constructed from the laser point cloud collected on a flat travel plane.

Preferably, the robot suspension judgment method further comprises in response to the connection line between the observation point and the target positioning point does not pass through the obstacle grid, the laser beam simulation line segment where the target positioning point and the observation point are located is not set as the laser beam simulation line segment with judgment function, then in the frame of laser point cloud, a currently acquired increment of the number of the laser beam simulation line segment with judgment function is 0. Combining with FIG. 3, it can be seen that if the line connecting the observation point O and the currently obtained target positioning point M1 does not pass through the obstacle grid, the laser beam simulation line segment OM1 where the currently obtained target positioning point M1 and the observation point O are located is not set as the laser beam simulation line segment with judgment function, which is equivalent to not performing the counting operation of the foregoing embodiment, then in the frame of laser point cloud, the number of increments of the currently acquired laser beam simulation line segment with judgment function is 0. Therefore, in the connection between the same observation point O and multiple target positioning points (corresponding to multiple laser beams or multiple laser beam simulation line segments), the connection that does not pass through the obstacle is directly excluded, that is, the laser beam simulation line segment (the laser beam to which it belongs, that is, the laser beam with a conversion relationship) where it is located is discarded, which improves the judgment efficiency.

Preferably, the robot suspension judgment method further comprises: in response to the length of the line connection between the target positioning point and its corresponding laser point being greater than the length of the line connection between the observation point and the same laser point, the laser beam simulation line segment at is not set as the laser beam simulation line segment with judgment function, then in the frame of laser point cloud, a currently acquired increment of the number of the laser beam simulation line segment with judgment function is 0. On the basis of FIG. 3, it can be seen that if the length of the line connecting the target positioning point M2 and its corresponding laser point N2 is greater than the length of the line connecting the observation point O and the laser point N2, that is, the length of the line segment M2N2 is greater than the length of the line segment ON2, it indicates that the distance measurement error of the laser beam simulation line segment ON2 emitted and converted by the laser sensor is relatively large, then the laser beam simulation line segment ON2 is not set as the laser beam simulation line segment with judgment function, which is equivalent to not executing in the aforementioned counting operation of the embodiment, in the frame of the laser point cloud, the currently acquired increment of the number of the laser beam simulation line segment with judgment function is 0. In this way, the laser beams with larger ranging errors of the laser sensor are eliminated.

In the above-mentioned embodiments, the manner in which the laser point is on the grid comprises that the laser point is located in the area surrounded by the four edges of the grid, and the laser point is located on the side of the grid, to reflect the two-dimensional location information of the scanned object, that is, the position of the feature point reflected from the surface of the scanned object is converted into the coordinate information in the grid map; wherein, in the frame of laser point cloud, the observation point is fixed to indicate that laser sensor is fixed at a specific position; a target positioning point corresponds to a laser point, a laser beam corresponds to a laser point, a laser beam simulation line segment corresponds to a laser point, and a laser beam corresponds to a laser beam simulation line segment, so that each laser beam simulation line segment can reflect the corresponding positioning information on the grid map, and a specific laser point is used to represent.

In the above embodiment, the robot suspension judgment method further comprises: after the laser sensor (that is, single-line laser radar or multi-line laser radar) emits one laser beam or multiple laser beams, any laser beam follows the laser probe of the laser sensor for a circle of rotation. And the laser information for the reflection of the laser beam in the area to be detected is controlled to convert into a laser point in the grid map, wherein the laser point is used to represent a positioning point where the scanned position point falls in the grid map; in response to ever the laser beam rotating once in the area to be detected, that is, one laser beam or multiple laser beams scan and cover once in the area to be detected, the converted laser points form the frame of laser point cloud; wherein, one laser beam corresponds to one laser point and one scanning angle corresponds to one laser point, and the laser points corresponding to all scanning angles form one frame of laser point cloud.

For a fixed object to be scanned, the laser sensor can be moved to obtain as much information as possible on the surface of the entity; in response to a beam of laser light hitting the surface of the object to be scanned, the reflected laser information will carry the orientation, distance and other information. Combining the principles of laser measurement and photogrammetry to obtain point clouds, including coordinates (XY), laser reflection intensity (Intensity) and color information (RGB); specifically, after the laser sensor acquires the spatial coordinates of each sampling point on the surface of the scanned object, a collection of points is obtained, which is called a point cloud (Point Cloud), so that the point cloud is also a massive point collection of the surface characteristics of the target. In response to the 3D data obtaining from different observation points (understood as laser sensors located at different positions or laser sensors moving to different positions in sequence) have a certain intersection and can completely cover the scanned object, it means that sufficient surface 3D data has been obtained. However, point clouds obtained from different observation points are uniformly converted into a map coordinate system.

It should be noted that the laser point is: the coordinate point where the laser information collected by the laser sensor and reflected from the scanned object is converted into a grid map. Then the laser point is the laser scanning point or the laser sampling point, which reflects the position information (including the detection distance and detection angle to the surface of the scanned object) and the laser reflection intensity; in response to the object being scanned, the reflected laser point information will be recorded while scanning. Due to the scanning is extremely fine, a large number of laser points can be obtained, so a laser point cloud can be formed. Among them, the laser sensor is generally a laser radar that supports 360-degree rotational scanning, with a laser emitting probe and a receiving probe; specifically, the laser information collected by the laser sensor reflecting from the scanned object includes the laser radar data packet, the laser radar data packet comprises several frames of laser point cloud data, each frame of laser point cloud data includes several laser points and each laser point contains angle (counterclockwise is positive direction) and distance.

In the grid map, in response to the line between an observation point and a laser point being set as the laser beam simulation line segment, then it is determined that the laser beam is mapped as the laser beam simulation line segment in the grid map, so that a laser beam simulation line segment corresponds to a laser point; wherein, the observation point is the position marked by the laser sensor in the grid map, and the observation point is configured to indicate a starting emission point of the laser beam, and the observation point is marked as the current position of the mobile robot.

In some embodiments, in response to one frame of laser point cloud being obtained, those skilled in the art can easily obtain the position and angle of each laser point in the frame of laser point cloud in the laser radar coordinate system and the carried environment intensity information. The lidar is fixed on the mobile robot. In some embodiments, the two frames of laser point clouds correspond to the same entity in the physical space. The reason why the two frames of laser point clouds behave differently is that the laser radar is moving with the mobile robot, and there can be laser point cloud. A corresponding to the pose of the robot in the previous frame, and laser point cloud B corresponding to the pose of the robot in the current frame; in response to the two frames of laser point clouds being aligned, the relative pose relationship between the two frames before and after can be calculated.

On the basis of the aforementioned embodiments, the present disclosure also comprises the robot suspension judgment method. As shown in FIG. 2, the map update method also comprises: step S201, controlling the laser beam emitted by the laser sensor to scan the area to be detected, to obtain a laser beam simulation line segment; at the same time, obtaining a pre-built grid map; and then proceeding to step S202.

Step S202, based on the number of obstacle grids passed by the laser beam simulation line segment mentioned in step S201 within the allowable range of the ranging error, a laser beam simulation line segment with judgment function is obtained, and the laser beam simulation line segment with judgment function is counted; then turn into step S203.

Step S203, in one frame of laser point cloud, which may be in each frame of laser point cloud, whether the ratio of the number of laser beam simulation line segments with judgment function achieved in the step S202 to the number of all mapped laser beam simulation line segments is greater than the preset ratio threshold, in response to the ratio of the number of laser beam simulation line segments with judgment function to the number of all mapped laser beam simulation line segments being greater than the preset ratio threshold, turn into step S204, otherwise turn into step S205. It should be noted that the laser beam simulation line segments corresponding to the laser points in multiple directions of the aforementioned observation point (the body position of the mobile robot) are all involved in the judgment of the ratio.

Step S205, updating the information carried by the frame of laser point cloud to the associated information of the corresponding hit grid in the grid map.

Step S204, stopping updating the grid map.

It should be noted that, for the specific execution actions involved in steps S201 to S203, refer to the corresponding embodiment of the aforementioned method for judging whether the robot is in a suspended state, which will not be repeated here.

For step S204, immediately stop updating the previously constructed grid map, but retain the previously constructed grid map, including retaining the coordinate position information, angle information and obstacle occupancy probability information of the relevant grid, to avoid In the process of whether the robot is in a suspended state or not, the laser point cloud collected in real time has been configured to update the originally constructed grid map, that is, to avoid the problem of map overlapping blur caused by the lag of related detection methods in the prior art. In the corresponding working scene of the mobile robot, in response to the mobile robot crossing obstacles (crossing low toy obstacles, slopes, and thresholds), due to the increase in its own height, it is possible to scan the laser point cloud information outside the wall. After the first constructed map, in the area to be detected reflected by the grid map, the wall obstacles that should have been marked as blocking the moving of the robot have changed to reflect the point cloud information on the back of the wall. Therefore, step S204 does not allow the grid map to be updated by the currently collected laser point cloud information, to avoid the overlap and blurring of the map constructed in real time in the scene where the robot is lifted or dropped, which cannot reflect the real working area of the robot; in addition, in response to the mobile robot dropping from the steps, as the detection height decreases, the laser sensor may scan the laser point cloud information on the horizontal ground. If it is superimposed on the pre-built map, the obtained positioning information is all point cloud information on the horizontal ground, so that the actual mark in the map is position information outside the target detection area. Therefore, at this time, step S204 does not allow the grid map to be updated by the currently collected laser point cloud information, to avoid the map overlapping and blurring in the real-time constructed map in the scene where the robot is lifted or dropped to have map overlap blurring so as to fail to reflect the real working area of the robot.

For step S205, it is allowed to update the previously constructed grid map in time, including updating the coordinate position information, angle information and obstacle occupancy probability of the relevant grid, reflecting the real working area of the robot, which is convenient for the robot to work in the real working area along the existing motion route (including the direction of motion). Therefore, in the laser beams corresponding to the constraints of the same frame of laser point cloud, it is decided based on the ratio of the number of laser beams with judgment function to the laser beams in all detectable directions whether to update the previously constructed grid map, and after judging that whether the robot is in the suspended state, adjusting the update strategy of the map in time; in this embodiment, each laser point that exists in one frame of laser point cloud corresponds to a laser beam, and in one frame of laser point cloud, each laser point is matched to only one laser beam.

Compared with the prior art, the beneficial technical effect of the aforementioned steps is that based on the number and ratio information of the obstacle grids passed by the laser beam corresponding to one frame of laser point cloud in the grid map, it is judged that whether the movement of the robot in the area to be detected will become a suspended state or whether there is a tendency to become a suspended state before updating the map, instead of making real-time judgments in the scene where the robot has become suspended and the corresponding map is updated in real time, after knowing the corresponding robot behavior state information or the behavior state trend that appears in front of the travel plane, the decision on the construction method of the map is made, and the pre-built grid map is updated to avoid overlapping and blurring of the map constructed in real time in the scene where the robot is lifted or dropped, to reflect the real working area of the robot; so the robot can continue to use the currently constructed grid map for navigation and positioning.

Specifically, the method for updating the information carried by the one frame of laser point cloud to the associated information of the grid corresponding to the hit in the grid map comprises: updating the pose information carried by the one frame of laser point cloud to the position information of the grid corresponding to the hit in the grid map, to configure a latest hit grid of the corresponding laser point in the grid map, and match the real-time pose information of the robot; wherein, the laser points existing in the frame of laser point cloud are the coordinate points converted from the scanned position points in the area to be detected to a coordinate system of the grid map, the pose information carried by the laser points comprises angle information and distance information. At the same time, a probability that the obstacle at the scanned position point falls into the corresponding grid position of the grid map is updated to the probability that the laser point hits the corresponding grid in the grid map, so that the updated grid map completely reflects the target working area of the robot.

It should be noted that whether it is a two-dimensional grid map or a three-dimensional grid map, it includes information indicating the probability of obstacles in a specific location or area, and the laser sensor of the mobile robot can scan the object to be measured to obtain the position information of the object to be measured, and on this basis, the probability of the object to be measured falling into the corresponding grid position of the map is calculated. At different times in the same posture, the detection distance of a fixed obstacle (object to be measured) by the laser sensor is inconsistent. It is possible that the detection distance involved in one frame of laser point cloud collected at one time is 5 m. The detection distance involved in one frame of laser point cloud collected at another moment is 5.1 m. In order not to mark the positions of 5 m and 5.1 m as the aforementioned fixed obstacles, it is necessary to use the occupancy grid map construction algorithm to calculate the probability of the aforementioned fixed obstacle falling into (hitting) the corresponding grid position of the map, and then determine the precise position of the aforementioned fixed obstacle in the map based on the magnitude of the probability value. In the prior art, the space occupied by the size of the mobile robot is usually not considered. Therefore, in the present disclosure, the mobile robot is reduced to one point no matter whether the map changes or not. Specifically, a grid map with a certain resolution is composed of a certain number of laser points, specifically constructed from a probability grid [Pmin, Pmax] with a size of 5 cm*5 cm, whether it is a two-dimensional grid map or a three-dimensional grid map. In response to the map being created, the grid probability is less than Pmin, indicating that there is no obstacle at the grid position between Pmin and Pmax, indicating unknown; and greater than Pmax, indicating that there is an obstacle at the grid position. The laser point cloud of each frame will generate a set of grids. In this set of grids, each grid is given an occupancy probability value. If the grid has a probability value before, the probability value of the grid needs to be updated.

Preferably, the grid corresponding to the hit in the grid map is a grid with the smallest positioning error with the scanned position point, comprising a neighboring grid of the grid where the laser point is located, or the grid where the points passed by the laser beam simulation line segments and located at a reasonable distance from the laser point is located, to make the laser point more accurately reflect the physical location information of its location.

The embodiment of the present disclosure also discloses a chip. The chip implements any step of the robot suspension judgment method disclosed in the above-mentioned related embodiments by executing the algorithm program code stored in the chip, and/or any step of the map update method disclosed in the aforementioned related embodiments. In response to the above-mentioned mobile robot is a cleaning robot, the cleaning robot can be equipped with the chip to detect whether the driving wheels of the cleaning robot are in the suspended state, and detect whether there is a step surface, a cliff surface or a slope in front of the travel plane of the mobile robot.

Compared with the prior art, the beneficial technical effect of the present disclosure is that, based on the number and ratio of the obstacle grids passed by the laser beam corresponding to one frame of laser point cloud in the grid map, it is judged that whether the movement of the robot in the area to be detected will become a suspended state or whether there is a tendency to become a suspended state before updating the map, instead of making real-time judgments in the scene where the robot has become suspended and the corresponding map is updated in real time, after knowing the corresponding robot behavior state information or the behavior state trend that appears in front of the travel plane, the decision on the construction method of the map is made, and the pre-built grid map is updated to avoid overlapping and blurring of the map constructed in real time in the scene where the robot is lifted or dropped, to reflect the real working area of the robot; so the robot can continue to use the currently constructed grid map for navigation and positioning.

Specifically, the chip is arranged on the circuit board in the body of the cleaning robot, including a non-transitory memory, such as a hard disk, flash memory, and random access memory, and a computing processor, such as a central processing unit, an application processing unit, the application processor executes the mapping algorithm according to the obstacle information fed back by the laser sensor, such as real-time positioning and map construction (SLAM, full name Simultaneous Localization And Mapping), to draw an instant map of the robot's environment and marks the location of obstacles. In some embodiments, combined with the distance information and the speed information fed back by the buffer set on the sensing devices such as laser sensors, cliff sensors, drop sensors (a limit switch trigger device), magnetometers, accelerometers, gyroscopes and odometers, the chip comprehensively judges the current working state and position of the cleaning robot, as well as the current posture of the cleaning robot, such as crossing the threshold, on the carpet, at the cliff of steps, full of dust boxes, being lifted, etc. And specific next-step action strategies are given in different situations, so that the work of the cleaning robot is more in line with the requirements of the owner and has a better user experience.

Apparently, the above-mentioned embodiments are only examples for clear description, rather than limiting the implementation. For those of ordinary skill in the art, other changes or changes in different forms can be made on the basis of the above description. It is not necessary and impossible to exhaustively list all the implementation manners here. And the obvious changes or changes derived therefrom are still within the scope of protection of the present disclosure.

What is claimed is:

1. A robot suspension judgment method based on laser points, which is suitable for mobile robots equipped with laser sensors, the robot suspension judgment method comprising:

controlling laser beams emitted by the laser sensor to scan an area to be detected, so as to obtain laser beam simulation line segments; at the same time, obtaining a pre-built grid map;

according to the number of obstacle grids passed by the laser beam simulation line segments within an allowable range of ranging error, obtaining the laser beam simulation line segments with judgment function, and counting the laser beam simulation line segments with judgment function;

according to a ratio of the number of the laser beam simulation line segments with the judgment function to the number of all the laser beam simulation line segments, judging whether the mobile robot is in a suspended state, or whether the mobile robot has a trend to become in a suspended state in front of a travel plane of the mobile robot.

2. The robot suspension judgment method according to claim 1, wherein, according to the ratio of the number of the laser beam simulation line segments with the judgment function to the number of all the laser beam simulation line segments, judging whether the mobile robot is in the suspended state, or whether the mobile robot has the trend to become suspended in front of the travel plane of the mobile robot comprises:

controlling the laser beams to be mapped to the laser beam simulation line segments in the grid map, wherein, when acquiring one frame of laser point cloud, a position of the laser sensor in the area to be detected is unchanged;

in the one frame of the laser point cloud, when the ratio of the number of the acquired laser beam simulation line segments with the judgment function to the number of all the laser beam simulation line segments which map in the grid map is less than or equal to a preset ratio threshold, determining that the mobile robot is not in the suspended state, or that there is no tendency to become the suspended state in front of the travel plane of the mobile robot;

in the one frame of the laser point cloud, when the ratio of the number of the acquired laser beam simulation line segments with the judgment function to the number of all the laser beam simulation line segments which map in the grid map is greater than the preset ratio threshold, determining that the mobile robot is in the suspended state, or that there is the tendency to become the suspended state in front of the travel plane of the mobile robot.

3. The robot suspension judgment method according to claim 2, wherein, the suspended state comprises that a front part of a body of the mobile robot is tilted upwards so as to determine that the mobile robot is lifted relative to a current travel plane during a movement process, and the driving wheels of the mobile robot are changed to a suspended state; the suspended state also comprises that the front part of the mobile robot body is tilted downwards so as to determine that the mobile robot drops relative to the current travel plane during the movement process, and driving wheels of the mobile robot become in the suspended state.

4. The robot suspension judgment method according to claim 1, wherein, a source of each of the obstacle grids passed by the laser beam simulation line segments within the allowable range of the ranging error is:

in the grid map, along a straight line direction of the laser point pointing to an observation point, a point that is apart from the laser point by a preset error distance is set as a target positioning point; wherein, the connection line between the observation point and the laser point is the laser beam simulation line segment; the observation point is marked as a position of the laser sensor in the grid map;

then, in the case of excluding the grid where the observation point is located and the grid where the target positioning point is located, the obstacle grid passing through a line connecting the observation point and the target positioning point is marked as a pre-configured obstacle grid, and it is determined that the pre-configured obstacle grid is the obstacle grid passed by the laser beam simulation line segment within the allowable range of the ranging error; wherein, the obstacle grid is a grid occupied by an obstacle in an area to be detected.

5. The robot suspension judgment method according to claim 4, wherein, when the observation point is located on a edge of a grid, the grid where the observation point is located is a first grid that the laser beam simulation line segment passes along a laser observation direction; wherein, the laser observation direction is a straight line direction from the observation point points to the laser point so as to form the laser observation direction of the laser beam simulation line segment;

when the target positioning point is located on the edge of the grid, the grid where the target positioning point is located is the first grid through which a line connecting the target positioning point and the laser point to pass along the laser observation direction.

6. The robot suspension judgment method according to claim 5, wherein, a manner in which the laser point is on the grid comprises that the laser point is located in an area surrounded by four edges of the grid, and the laser point is located on a side of the grid, so as to reflect two-dimensional location information of a scanned object;

wherein, in one frame of laser point cloud, the observation point is fixed, one target positioning point corresponds to one laser point, one laser beam corresponds to one laser point, one laser beam simulation line segment corresponds to one laser point, and one laser beam corresponds to one laser point, one laser beam corresponds to one laser beam simulation line segment.

7. The robot suspension judgment method according to claim 4, wherein, according to the number of the obstacle grids passed by the laser beam simulation line segments within the allowable range of the ranging error, obtaining the laser beam simulation line segments with the judgment function comprises:

in the laser beam simulation line segment, along the line connecting the observation point and the target positioning point, counting the pre-configured obstacle grids that this line passes through to achieve a count value; and when the count value of the pre-configured obstacle grids is greater than a preset number threshold, the laser beam simulation line segment where the connection line between the observation point and the target positioning point is located is set as the laser beam simulation line segment with the judgment function, so that a laser beam corresponding to a straight line direction of the observation point to the target location point is marked as the laser beam with the judgment function.

8. The robot suspension judgment method according to claim 7, wherein, the robot suspension judgment method also comprises: when the connection line between the observation point and the target positioning point does not pass through the obstacle grid, the laser beam simulation line segment where the target positioning point and the observation point are located is not set as the laser beam simulation line segment with the judgment function, then a currently acquired increment of the number of the laser beam simulation line segments with the judgment function is 0.

9. The robot suspension judgment method according to claim 7, wherein, the robot suspension judgment method also comprises: when a length of the line connecting the target positioning point and the laser point is greater than a length of the line connecting the observation point and a same laser point, the laser beam simulation line segment where the target positioning point and the observation point are located is not set as the laser beam simulation line segment with judgment the function, then a currently acquired increment of the number of the laser beam simulation line segments with the judgment function is 0.

10. The robot suspension judgment method according to claim 4, wherein, when a length of the line connecting the observation point and the laser point is less than a preset threshold length, the preset error distance is a fixed value;

when the length of the line connecting the observation point and the laser point is greater than or equal to the preset threshold length, the preset error distance is positively correlated with a length of the laser beam simulation line segment.

11. The robot suspension judgment method according to claim 1, wherein, the robot suspension judgment method also comprises:

controlling laser information of the laser beam reflect in the area to be detected to convert into a laser point in the grid map, wherein the laser point is used to represent a positioning point where a scanned position point falls in the grid map; whenever the laser beam rotates once in the area to be detected, converted laser points form one frame of laser point cloud; wherein, one laser beam corresponds to one laser point and one scanning angle corresponds to one laser point;

in the grid map, setting the line between an observation point and a laser point as the laser beam simulation line segment, then determining that the laser beam is mapped as the laser beam simulation line segment in the grid map, so that a laser beam simulation line segment corresponds to a laser point;

wherein, the observation point is a position marked by the laser sensor on the grid map, and the observation point is used to indicate a starting emission point of the laser beam.

12. A map update method based on laser points, wherein, the map update method comprises the robot suspension judgment method according to claim 1;

the map update method also comprises:

in one frame of laser point cloud, when the ratio of the number of the acquired laser beam simulation line segments with the judgment function to the number of all the mapped laser beam simulation line segments is less than or equal to a preset ratio threshold, updating information carried by the one frame of laser point cloud to an associated information of the grid corresponding to the hit in the grid map, so as to realize the update of a pre-built grid map in an area to be detected;

in the one frame of laser point cloud, when the ratio of the number of the acquired laser beam simulation line segments with the judgment function to the number of the all mapped laser beam simulation line segments is great than the preset ratio threshold, stopping updating the grid map.

13. The map update method according to claim 12, wherein, the method for updating the information carried by the one frame of the laser point cloud to the associated information of the grid corresponding to the hit in the grid map comprises:

updating pose information carried by the one frame of laser point cloud to the position information of the grid corresponding to the hit in the grid map, so as to configure a latest hit grid of the corresponding laser point in the grid map; wherein, the laser points existing in the one frame of laser point cloud are coordinate points converted from scanned position points in the area to be detected to a coordinate system of the grid map, the pose information carried by the laser points comprises angle information and distance information;

at the same time, a probability that the obstacle at the scanned position point falls into the corresponding grid position of the grid map is updated to the probability that the laser point hits the corresponding grid in the grid map.

14. The map update method according to claim 13, wherein, the grid corresponding to the hit in the grid map is a grid with smallest positioning error with the scanned position point, comprising a neighboring grid of the grid where the laser point is located, or the grid where a point passed by the laser beam simulation line segment and located at a reasonable distance from the laser point is located.

15. A chip, wherein, the chip implements the robot suspension judgment method according to claim 1.

\* \* \* \* \*